(12) United States Patent
Howard et al.

(10) Patent No.: US 7,792,952 B2
(45) Date of Patent: Sep. 7, 2010

(54) RATING SYSTEM FOR WEB SERVICES

(75) Inventors: Michael L. Howard, Sandy, UT (US); William R. Harper, Jr., Satl Lake City, UT (US)

(73) Assignee: Panasonic Electric Works Co., Ltd., Osaka (JP)

(*) Notice: Subject to any disclaimer, the term of this patent is extended or adjusted under 35 U.S.C. 154(b) by 1048 days.

(21) Appl. No.: 10/404,583

(22) Filed: Mar. 31, 2003

(65) Prior Publication Data
US 2004/0193696 A1 Sep. 30, 2004

(51) Int. Cl.
G06F 15/173 (2006.01)
G06F 15/16 (2006.01)
(52) U.S. Cl. .................. 709/224; 709/223; 709/217
(58) Field of Classification Search .......... 709/229, 709/226, 223, 203, 219, 224
See application file for complete search history.

(56) References Cited

U.S. PATENT DOCUMENTS

| | | | |
|---|---|---|---|
| 6,236,977 B1* | 5/2001 | Verba et al. .......... | 705/10 |
| 6,721,780 B1* | 4/2004 | Kasriel et al. ....... | 709/203 |
| 6,819,746 B1* | 11/2004 | Schneider et al. ..... | 379/29.01 |
| 7,171,470 B2* | 1/2007 | Doyle et al. ........ | 709/225 |
| 2001/0034637 A1* | 10/2001 | Lin et al. ............ | 705/10 |
| 2002/0141351 A1* | 10/2002 | Maltz et al. ........ | 370/254 |
| 2003/0046396 A1* | 3/2003 | Richter et al. ...... | 709/226 |
| 2003/0177160 A1* | 9/2003 | Chiu et al. .......... | 709/100 |
| 2003/0195813 A1* | 10/2003 | Pallister et al. ...... | 705/26 |
| 2004/0111504 A1* | 6/2004 | Halim et al. ........ | 709/223 |
| 2004/0122926 A1 | 6/2004 | Moore et al. | |
| 2004/0133656 A1* | 7/2004 | Butterworth et al. .... | 709/219 |
| 2005/0278417 A1* | 12/2005 | Fremantle et al. ...... | 709/203 |

OTHER PUBLICATIONS

Web Services Description Language (WSDL) Version 1.2, Roberto Chinnici et al., http://www.w3.org/TR/wsdl12, W3C, pp. 1-59, 2003.
Web Services Description Language (WSDL) Version 1.2: Bindings, Jean-Jacques Moreaui et al., http://www.w3.org/TR/wsdl12-bindings, W3C, pp. 1-32, 2003.
"Web Services Architecture Requirements," Daniel Austin et al., http://www.w3.org/TR/2002/WD-wsa-reqs-20021114, W3C, pp. 1-20, 2002.
"Web Services Architecture," Michael Champion et al. http://www.w3.org/TR/2002/WD-ws-arch-20021114, W3C, pp. 1-61, 2002.
"Web Services Description Requirements," Jeffrey C. Schlimmer, http://www.w3.org/TR/ws-desc-reqs, W3C, pp. 1-14, 2002.
Web Service Description Usage Scenarios, Waqar Sadiq et al., http://www.w3.orq/TR/ws-desc-usecases, W3C, pp. 1-23, 2002.

* cited by examiner

*Primary Examiner*—Benjamin R Bruckart
(74) *Attorney, Agent, or Firm*—Austin Rapp & Hardman

(57) ABSTRACT

A system for rating web services is disclosed. The system includes a computer with a network interface for electronic communications with a communications network. The computer is configured to process rating information input regarding a web service and use the rating information input. The computer is also configured to respond to a request for rating information. The system also includes multiple web services identifications for identifying web services. Web service information that relates to the web services is also included. The web service information is obtained through use of the rating information input.

31 Claims, 9 Drawing Sheets

RATING SYSTEM FOR WEB SERVICES

TECHNICAL FIELD

This invention relates generally to computer systems relating to web services, and is more particularly directed toward a rating system for web services.

BACKGROUND

Computer and communication technologies continue to advance at a rapid pace. Indeed, computer and communication technologies are involved in many aspects of a person's day. For example, many devices being used today by consumers have a small computer inside of the device. These small computers come in varying sizes and degrees of sophistication. These small computers include everything from one microcontroller to a fully functional complete computer system. For example, these small computers may be a one-chip computer, such as a microcontroller, a one-board type of computer, such as a controller, a typical desktop computer, such as an IBM-PC compatible, etc.

Computers typically have one or more processors at the heart of the computer. The processor(s) usually are interconnected to different external inputs and outputs and function to manage the particular computer or device. For example, a processor in a thermostat may be connected to buttons used to select the temperature setting, to the furnace or air conditioner to change the temperature, and to temperature sensors to read and display the current temperature on a display.

Many appliances, devices, etc., include one or more small computers. For example, thermostats, furnaces, air conditioning systems, refrigerators, telephones, typewriters, automobiles, vending machines, and many different types of industrial equipment now typically have small computers, or processors, inside of them. Computer software runs the processors of these computers and instructs the processors how to carry out certain tasks. For example, the computer software running on a thermostat may cause an air conditioner to stop running when a particular temperature is reached or may cause a heater to turn on when needed.

Computing devices may be used to monitor or control many different systems, resources, products, etc. With the growth of the Internet and the World Wide Web, computing devices are increasingly connected to the Internet so that they can be remotely monitored, accessed and/or controlled.

There are an increasing number of services that are available on the World Wide Web. A service that is available over the World Wide Web is referred to as a web service. In general, a "web service" is an interface that describes a collection of operations, services and/or data that is accessible through a communications network. A web service may be used individually, or it may be used with one or more other web services in an interoperable manner to carry out their part of a more complex operation. For example, using a purchase order transaction service may require automated interaction between a service for order placement at the ordering business and a service for order fulfillment at one or more of its business partners.

As web services continue to grow, there will be more users of web services. Sometimes users of web services may desire to know more about one or more web services that are available. Benefits may be realized if a rating system for web services was provided.

BRIEF DESCRIPTION OF THE DRAWINGS

The present embodiments will become more fully apparent from the following description and appended claims, taken in conjunction with the accompanying drawings. Understanding that these drawings depict only typical embodiments and are, therefore, not to be considered limiting of the invention's scope, the embodiments will be described with additional specificity and detail through use of the accompanying drawings in which:

DETAILED DESCRIPTION

Figure 1:
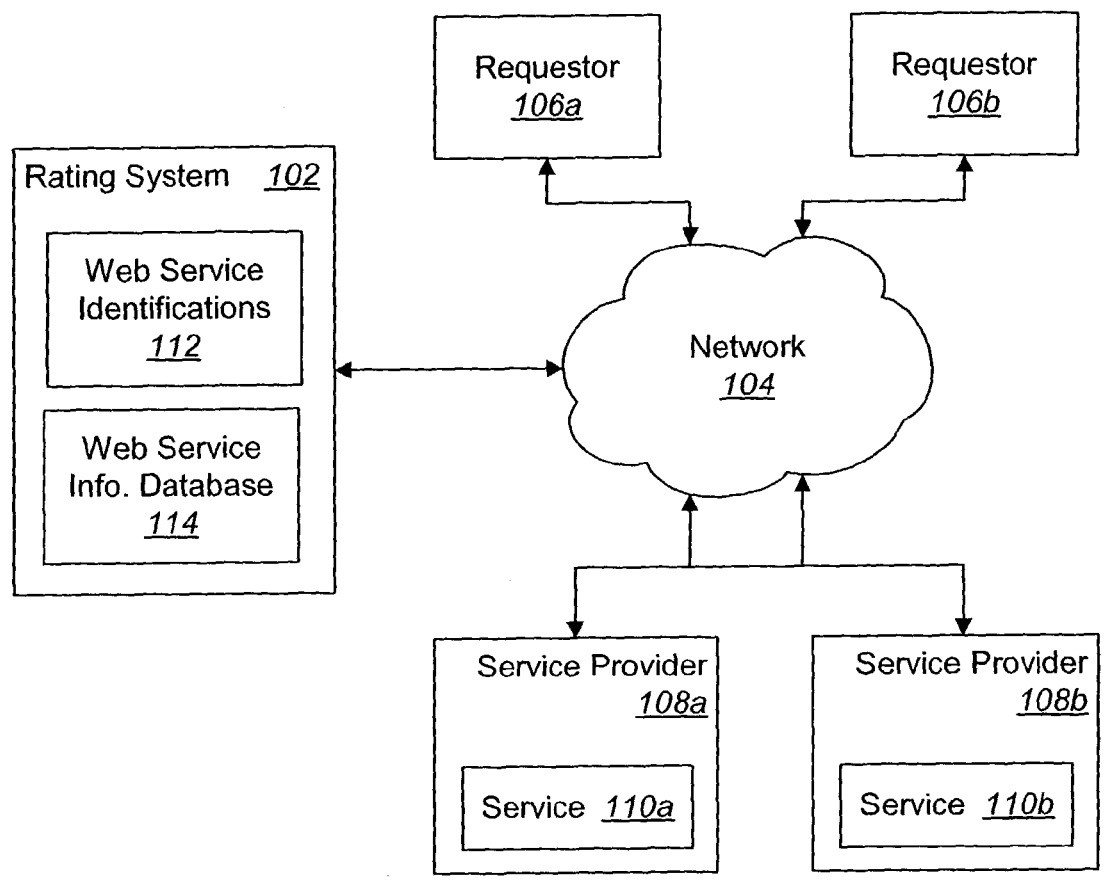
FIG. 1 is a network block diagram illustrating an embodiment of a rating system for web services.

It will be readily understood that the components of the embodiments as generally described and illustrated in the Figures herein could be arranged and designed in a wide variety of different configurations. Thus, the following more detailed description of the embodiments of the methods and apparatus of the present invention, as represented in the Figures, is not intended to limit the scope of the invention, as claimed, but is merely representative of the embodiments of the invention.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are shown to provide a thorough understanding of embodiments of the invention. One skilled in the relevant art will recognize, however, that the invention may be practiced without one or more of the specific details, or with other methods, components, materials, etc. In other instances, well-known structures, materials, or operations are not shown or described in detail to avoid obscuring aspects of the invention.

Several aspects of the embodiments described herein will be illustrated as software modules stored in a computing device. As used herein, a software module may include any type of computer instruction or computer executable code located within a memory device and/or transmitted as electronic signals over a system bus or network. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction, or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices.

A system 102 for rating web services is disclosed. A web service is any service that is accessible from a communications network and that can be provided over the communications network. Web services are known by those skilled in the art. Additional information regarding web services can be found at www.w3c.org.

The system 102 may be implementing using one or more computers. At least one of the computers includes a network interface for electronic communications with the communications network 104. Many different kinds of computers are commercially available and known by those skilled in the art. An embodiment of a computing device will be shown and discussed in relation to FIG. 12. Those skilled in the art will appreciate the various kinds of hardware and software that may be used to connect to and communicate with a communications network. For example, the network interface may include a network card, a modem, a wireless card, a communications port, etc.

The communications network 104 as shown in FIG. 1 may inherit many features of web services. Web services are accessed using web protocols, usually HTTP and SOAP. The architecture is based on the peer-to-peer paradigm of networking.

The term "network" as used herein refers to a system in which a series of nodes are interconnected by a communications path. A node is a computing device that communicates with other nodes. The specific behavior of a node is determined by the applications or software it executes. Examples of a communication network 104 include, but are not limited to, the Internet, a pager network, a cellular network, a global communications network, a local area network, a wide area network, other kinds of computer networks, a telephone network, a mobile IP network, etc.

Applications running on nodes of a network 104 communicate with each other through software modules that implement protocols, formalized rules for how data is sent over a network. Some protocols deal with the timing, sequencing, and error checking of data transmission. Others deal more with how the data is formatted and the commands and responses that the nodes exchange. A set of protocols that work together is called a protocol stack, with each protocol acting as a layer in the stack that is built on top of another layer. The top layer of a protocol stack is used by an application, the middle layers deal with transferring groups (packets and frames) of data between nodes, and the bottom layer deals directly with the networking hardware that transfers data.

Physical networks consist of nodes that are connected by some sort of physical medium (e.g., electrical wire, optical fiber, air). This physical connection may sometimes be referred to as a link. A physical network limited to two nodes may be referred to as point-to-point, while a physical network that may support more than two nodes may be referred to as multiple-access. Each node on a multiple-access network has a physical address that is used to distinguish it from the other nodes on the network.

Logical networks may be superimposed onto physical networks to specify a unique group of nodes. Each node in a logical network has a logical address that is mapped by a protocol to the node's physical address. A sub-network, or subnet, is a physically or logically independent portion of a network, distinguished by a subnet number.

Most protocols deal with logical networks because most physical network issues already have many well-defined implementations and defining new physical layers is not required. Logical networks also have the benefit of being insulated from the physical network, and are therefore more generally useful. For example, TCP/IP is defined on top of a logical network (IP). IP can run on many physical networks (Ethernet, serial, wireless, etc.). This makes TCP/IP a more generic solution than had it been defined only in terms of some specific physical network.

As shown in FIG. 1, the rating system 102 may communicate with requestors 106 and service providers 108. A requestor 106 is any type of computing device that is capable of accessing or requesting information. A service provider 108 is any type of computing device capable of providing a service 110 or that is capable of providing information. The rating system 102, requestors 106 and service providers 108 may be communicating with one another through the communications network 104.

The service 110 may be any kind of service that may be provided by a computing device. Some possible examples of services 110 include providing temperature data from a location, providing surveillance data, providing weather information, providing an audio stream, providing a video stream, printing documents, reserving a rental car, etc. Those skilled in the art will appreciate the many different kinds of services and/or data that may be provided over a computer network 104 from a provider 108.

The rating system 102 includes web service identifications 112 for identifying one or more web services in the rating system 102. A web service information database 114 will be more fully discussed below.

Figure 2:
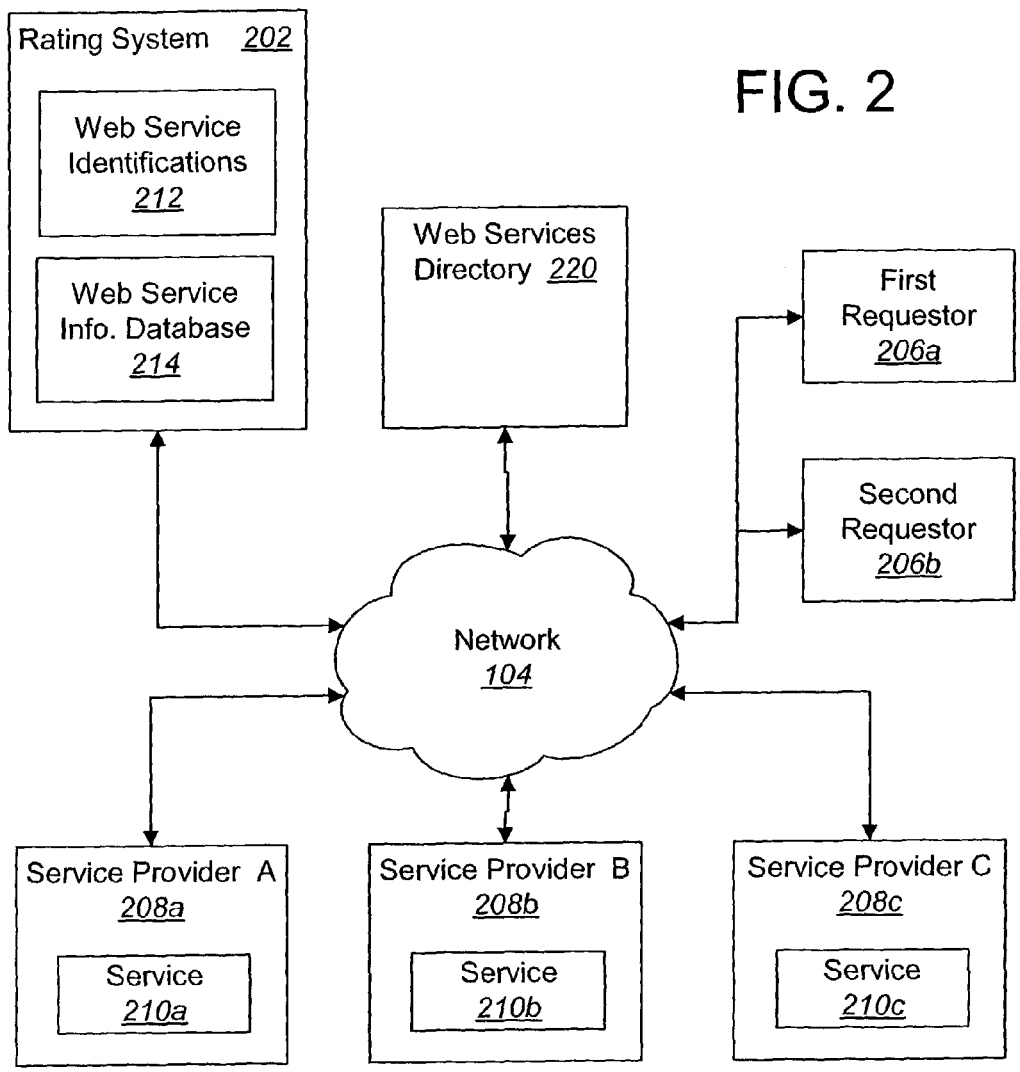
FIG. 2 is a network block diagram illustrating an embodiment of a rating system for web services and a web services directory.

FIG. 2 is a network block diagram illustrating a rating system 202 in communication with a web services directory 220. The web services directory 220 is a directory accessible via a communication network 104 that includes information about web services. The information describing the web services may simply be the web service URL or address, or it may include descriptive information about the web service. Web services directories 220 typically provide lists of different types of web services as well as information on how to access the web service (e.g., a URL).

The rating system 202 may also include a web service information database 214. The web service information database 214 includes information that relates to the web services.

Any type of information that may somehow be useful with respect to a web service may be stored in the web service information database 214. The database 214 may be stored in many different formats and through various different means. For example, the database may simply be a file or files with textual information in them, or the database may be an off-the-shelf database.

In the example shown in FIG. 2, the web services directory 220 would typically have the service providers 208 indexed in the directory 220 so that requestors 206 using the directory 220 may find the service providers 208 in the directory 220.

The roles of requestor 206 and provider 208 can be taken on by various devices and software nodes. A node serves as a requestor 206 when it 206 requests information or that a service be performed. A node serves as provider 208 when it is providing information or when it is providing a service.

The following is one possible way in which a requester 206 may establish a service communication link with a provider 208. The requester 206 connects to the network 104. Then the requestor 206 may request a list of providers from the directory 220 or from the rating system 202, if it is providing directory services. Using the list of providers, the requester 206 is able to determine what service it needs and it requests the service from a provider 208. The network enables a communication of the request from the requestor 206 to the provider 208. The provider 208 then begins providing the service(s) requested.

The rating system 102 is configured to receive rating information input regarding a web service. The input may be provided manually, via the communications network 104 or through other means. By configured it is meant that the system 102 includes the necessary software and/or hardware to accomplish the specified task. As will be discussed more fully below, the rating information input may be provided by various sources and may be in different forms.

The rating information input is usually stored by a computer in some form. The rating information input is not necessarily stored in the same form as it was received. In addition, the rating information input may not be stored at all. The rating information input is stored in some form in that web service information database 214 is compiled in part through use of the rating information input received.

Figure 3:
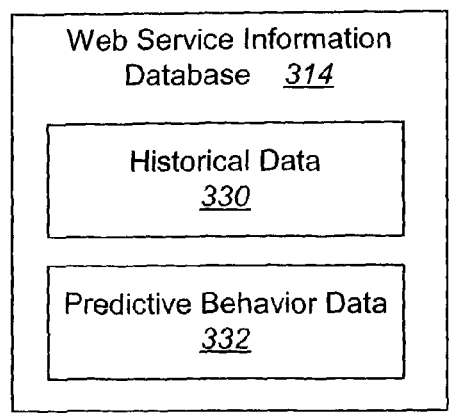
FIG. 3 is a block diagram of an embodiment of a web service information database.

FIG. 3 is a block diagram of an embodiment of a web service information database 314. The web service information database 314 may include historical data 330 and predictive behavior data 332. Historical data 330 is data that relates to past events that relate to a web service. Past events include events that happened some time ago as well as those events that occurred very recently. For example, some past events may be years old, while others may have occurred only seconds ago. Predictive behavior data 332 is data that is used in predicting future behavior of a web service. More details describing historical data 330 and predictor behavior data 332 will be described below.

Figure 4:
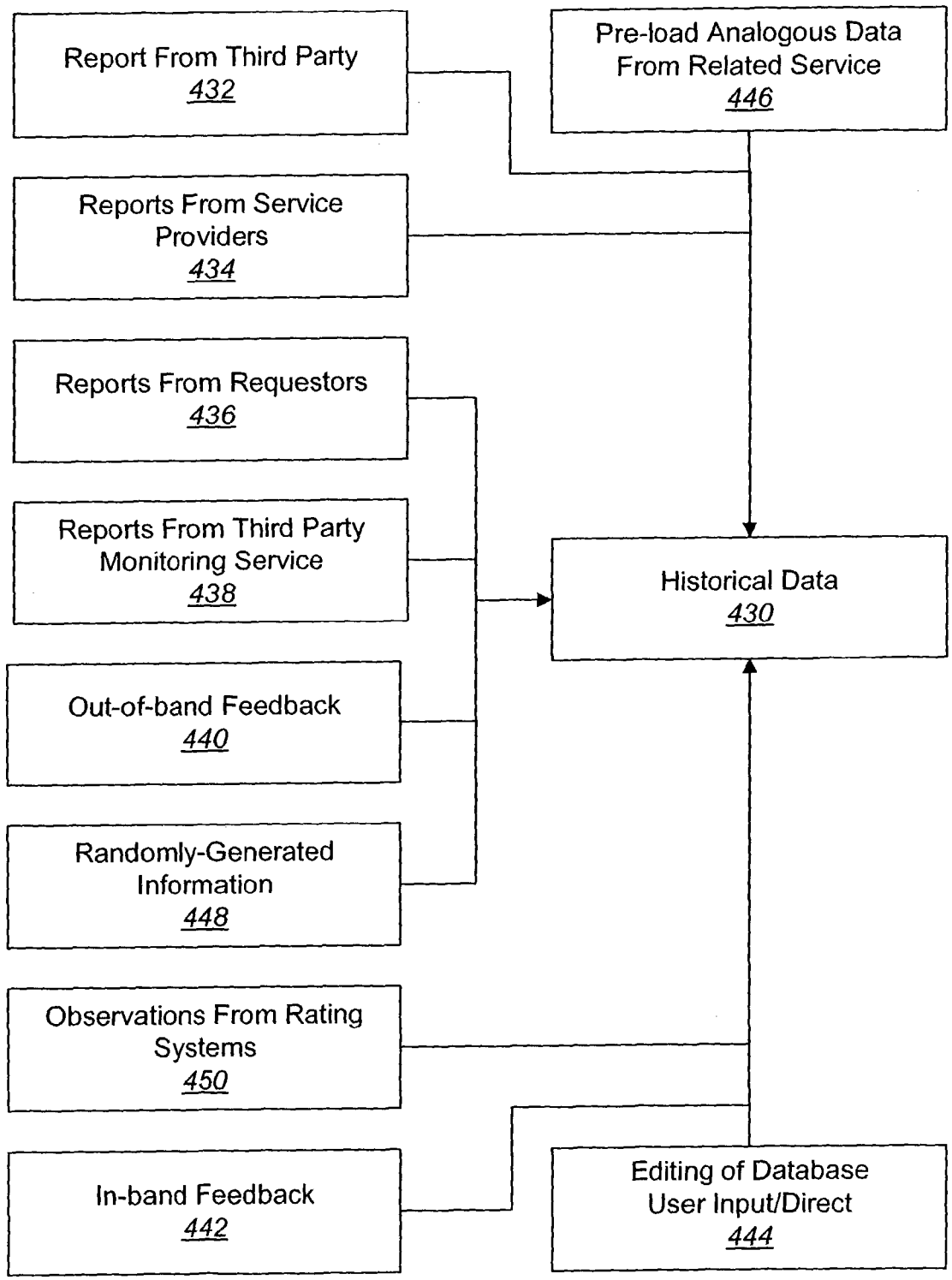
FIG. 4 is a block diagram illustrating different types of input that may be used to obtain or create historical data.

FIG. 4 is a block diagram illustrating examples of different types of input that may be used to obtain or create historical data 430. Reports may be sent from various parties. A report is simply information that is used by the rating system to compile historical data 430. The reports may include information reporting past performance of a web service. Reports may be submitted to the rating system by third parties 432. Reports may also be submitted by service providers 434 or requesters 436. A third party monitoring service may be used and reports may be submitted from the monitoring service 438.

Out-of-band feedback 440 may be provided. The rating system 102 itself may make observations 450 that may be used as input for the historical data 430. In-band feedback 442 may be provided as well.

The web service information database 314 may also be edited by user input 444, without any relation to historical events. The web service information database 314 may also be pre-loaded with data 446 from a related service. For example, if a new service is provided, the rating system 202 may use historical data 430 from a service that is related to or similar to the new service in some way. In certain circumstances, randomly generated information 448 may be used to provide historical data 430.

Figure 5:
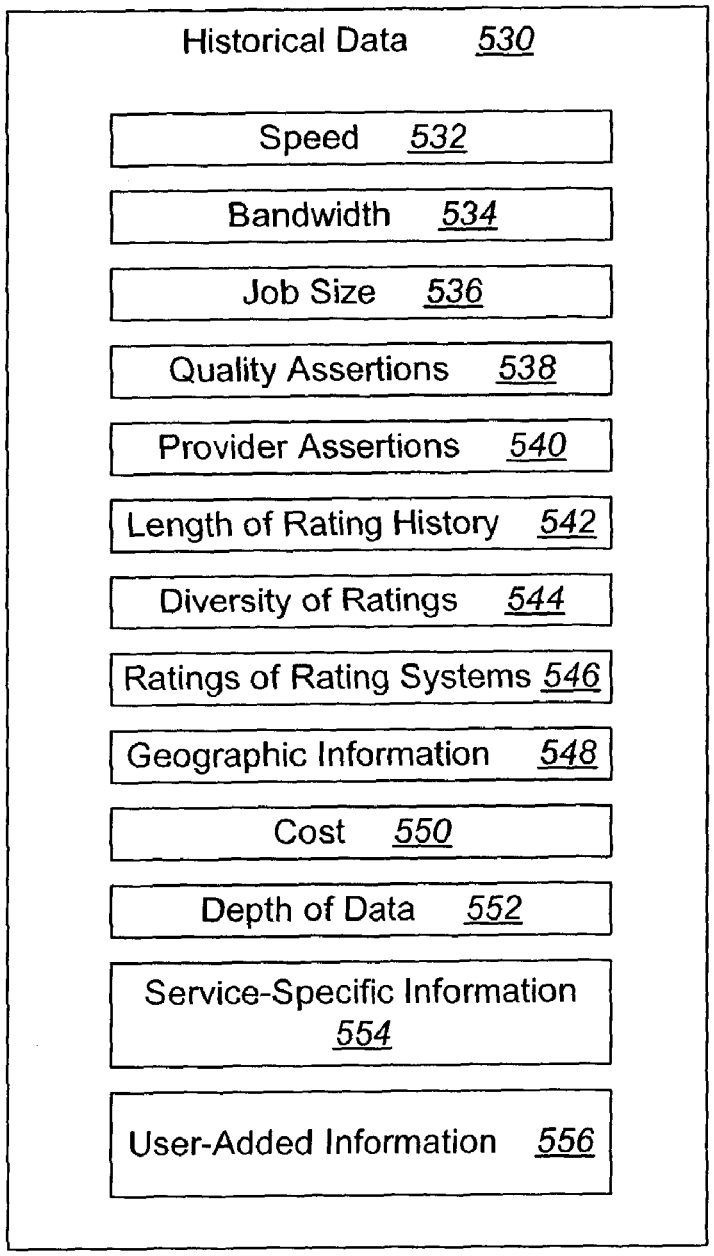
FIG. 5 is a block diagram of an embodiment of types of historical data.

FIG. 5 is a block diagram illustrating different types of historical data 530 that may be compiled and used. The examples shown in FIG. 5 are only meant as examples and are not limitations on what may or may not be used within historical data 530. Some of the historical data types may only be used with certain services, while others may be used with all services.

Speed data 532 may indicate how fast the service was performed. Bandwidth data 534 may indicate how much bandwidth the service was able to accommodate. The job size 536 may be used to indicate how large the job size was that was performed by the service. The quality assertions 538 may include qualitative information. The provider may also provide assertions 540 relating to the service. The length 542 of the rating history may also be considered. The diversity 544 of the rating sources may be used as part of the historical data. The ratings 546 of the ratings providers may also be used. Geographic information 548 may be included in the historical data. The cost 550 of the service may be stored. Another item that may be included in the historical data is the depth 552 of the data. Other service-specific information 554 may also be included in the historical data 530.

Service providers and/or users of the system may add other items 556 to be included in the historical data 530. For example, if a new service provider started providing a new service, it may submit new and different types of historical data 530 to be used by the rating system 102. If users were interested in a particular parameter, they could submit the new parameter to the rating system 102 as a request to track such data.

The different pieces of information of the historical data 530 may be used in determining a rating for a web service. In addition, the different pieces of information may be used as factors in determining an overall rating. The rating system 102 or users may weight the various factors differently according to the importance placed on each factor. For example, if cost 550 were the dominant factor for a particular user, the user may heavily weight the cost factor 550. If the bandwidth 534 were the dominant factor for a particular user, the user may more heavily weight the bandwidth factor 534. A further example of weighting the various factors or types of data will be shown below.

Figure 6:
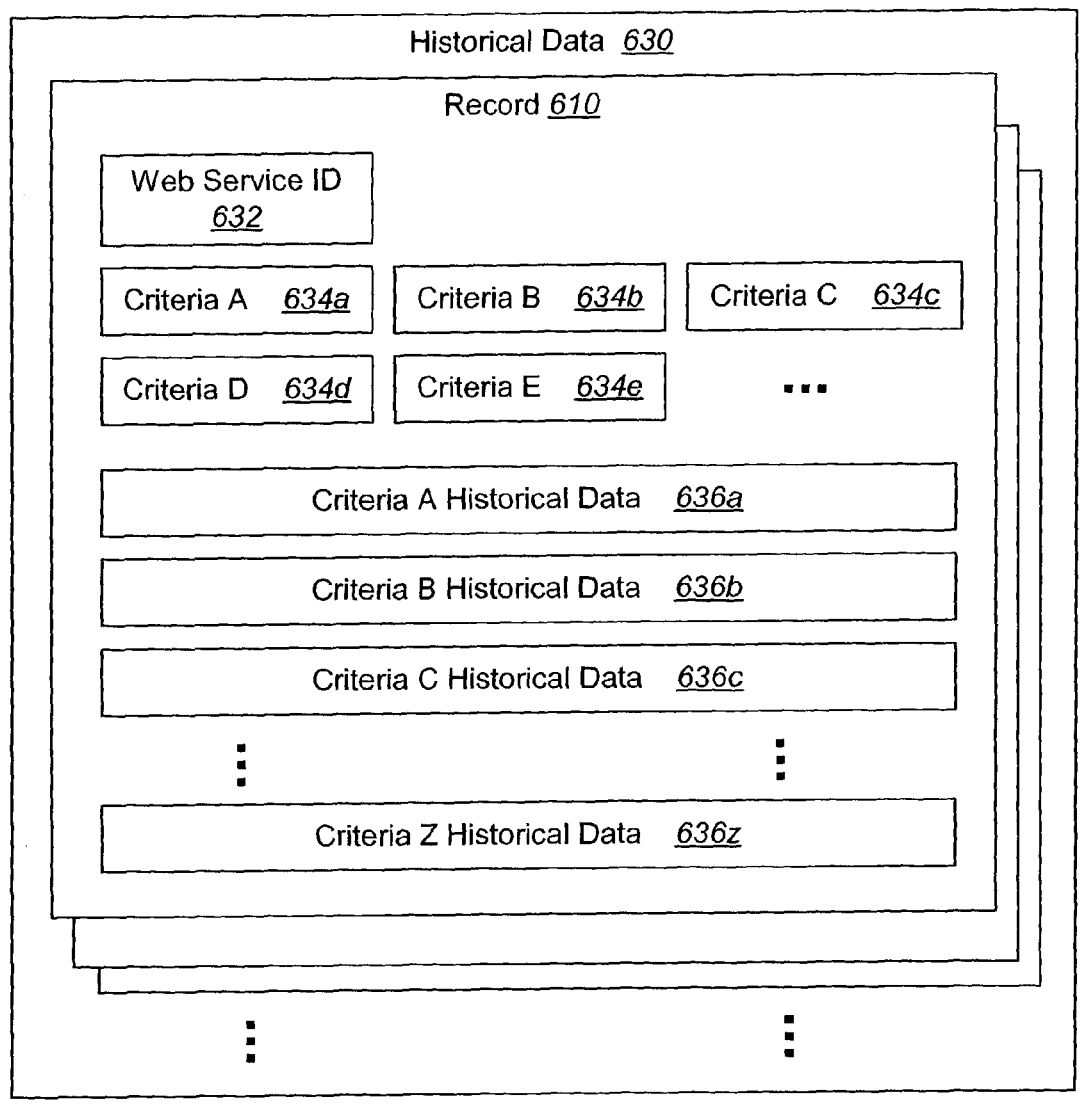
FIG. 6 is a block diagram of an embodiment of components that may be stored in the historical data.
Figure 7:
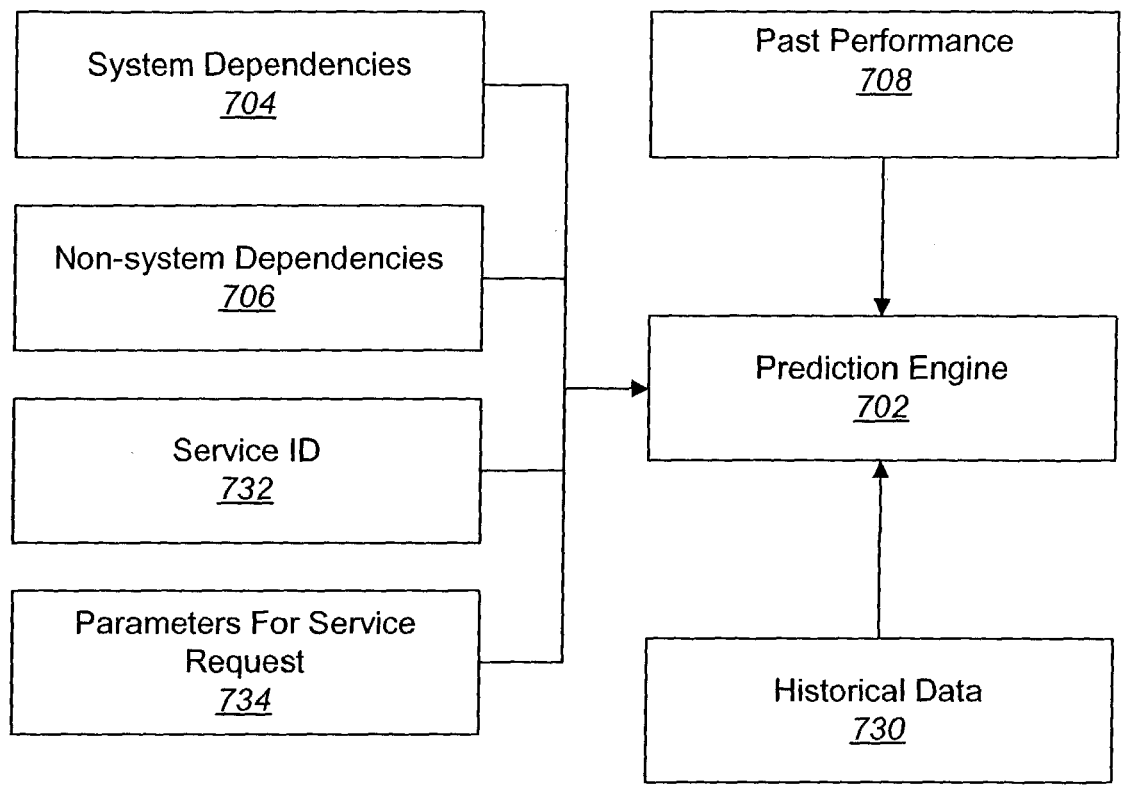
FIG. 7 is a block diagram of an embodiment of a prediction engine.

FIG. 6 is a block diagram illustrating an embodiment of components that may be stored in the historical data 630. A web service ID 632 identifies the web service. The different criteria 634 that may be viewed and/or considered in providing a rating are listed. The criteria historical data 636 is also stored. Of course, it will be appreciated by those skilled in the art that the web service information database 314 or any portion thereof may be implemented through use of a commercially available database. As a result, the particular layout or organization of the database may, to an extent, be affected by the particular database used. Accordingly, the diagram of FIG. 6 is only meant to illustrate examples of the different fields or items that may be used in the database, and is not meant to indicate any particular database organization or structure.

When a user requests a rating, the user may weight the different criteria according to its preference. For example, if the rating system provided a rating from 0 to 100, where 0 is the lowest and 100 is the highest rating, a formula utilizing weighting factors may be used. (The scale of 0 to 100 is only an example. It will be appreciated by those skilled in the art that any scale or no scale may be used.) Formula 1, below, is an example of how an overall rating may be provided through use of weighting factors and the different criteria available. The different weights are the W parameters. The C parameters are the different criteria for that particular web service.

$$\text{Rating} = W_1 C_1 + W_2 C_2 + W_3 C_3 + \quad \text{Formula 1.}$$

A simple example of a user requesting a rating for a web service may be helpful. A user may be interested in a web service of Company A for printing documents. For this example, assume that the different criteria for this web service are cost, speed and bandwidth. The user indicates the importance of these factors by assigning a 60% weight factor for cost, a 20% weight factor for speed and a 20% weight factor for bandwidth. In this example, the rating system 102 currently has ratings between 0 and 100 for each of cost, speed and bandwidth. For the sake of example, assume that the current cost rating based on the historical data is 80, that the current speed rating based on the historical data is 50 and that the current bandwidth rating based on the historical data is 30. The rating system 102, based on the importance of each criteria input by the user, would provide a rating of 64. The equation of Formula 2 illustrates this simple ratings example. If the user requested ratings for printing web services from Company A, Company B and Company C, the user may simply compare the different ratings provided and select the web service from the company with the highest rating.

$$\text{Rating} = (0.6)(80) + (0.2)(50) + (0.2)(30) \quad \text{Formula 2.}$$

The above example was meant as a simple illustration and in no way limits the many different ways in which ratings may be provided. The rating system may provide many different ways of analyzing historical data. In addition, the rating system may allow users to browse through historical data and analyze the information therein. Users may also build custom ratings formulas using the available information from the web services information database 214.

The rating system 102 may provide predictive information. To provide predictive information, the rating system 102 may include a prediction engine 702. Various inputs may be used by the prediction engine 702 to produce a prediction of how a web service may perform. The prediction engine 702 may use system dependencies 704, non-system dependencies 706, past performance 708 and historical data 730 as inputs to predicting future performance of a web service. The particular service ID 732 is also used, as well as any parameters 734 for the service request.

Figure 8:
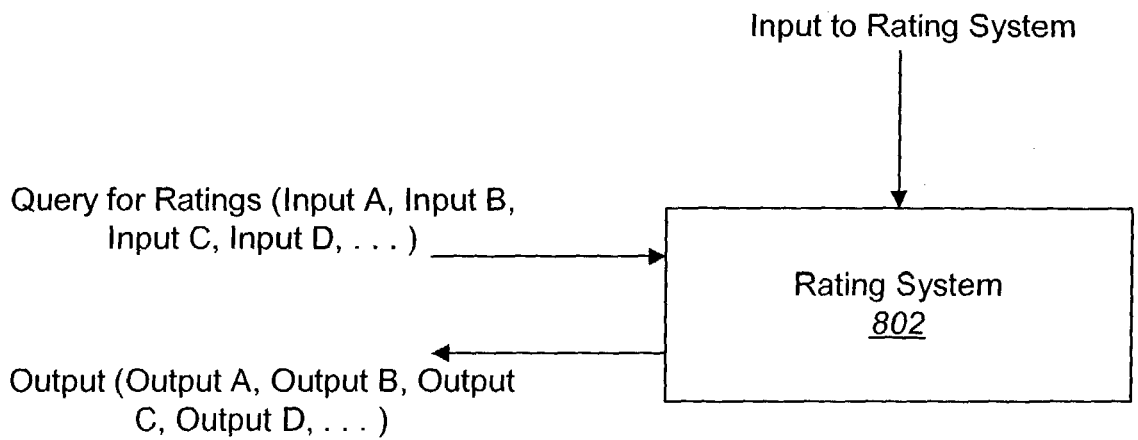
FIG. 8 is a general block diagram of an embodiment of a rating system illustrating input and output parameters.

FIG. 8 illustrates generally how users and systems may interact with the rating system 802. Users or systems may provide input to the rating system 802. In addition, users or systems may query the rating system for ratings or other information. As shown, the rating system may provide output to users or systems.

The query to the rating system 802 may be a single input or it may be a plurality of inputs. For example, the query may include what criteria the user values for the particular service. The query may include weights for weighting the various pieces of historical data. The query may include a specific formula that should be used by the rating system in providing ratings to the user. Similarly, the outputs from the rating system may be a single output or may be a plurality of outputs. The output may be a single value rating for a particular web service, or it may be a series of ratings of difference criteria for a web service. Furthermore, the outputs may be a series of ratings for different web services. It will be appreciated by those skilled in the art that there are countless ways that inputs may be used by a rating system and countless kinds of outputs that may be provided.

Figure 9:
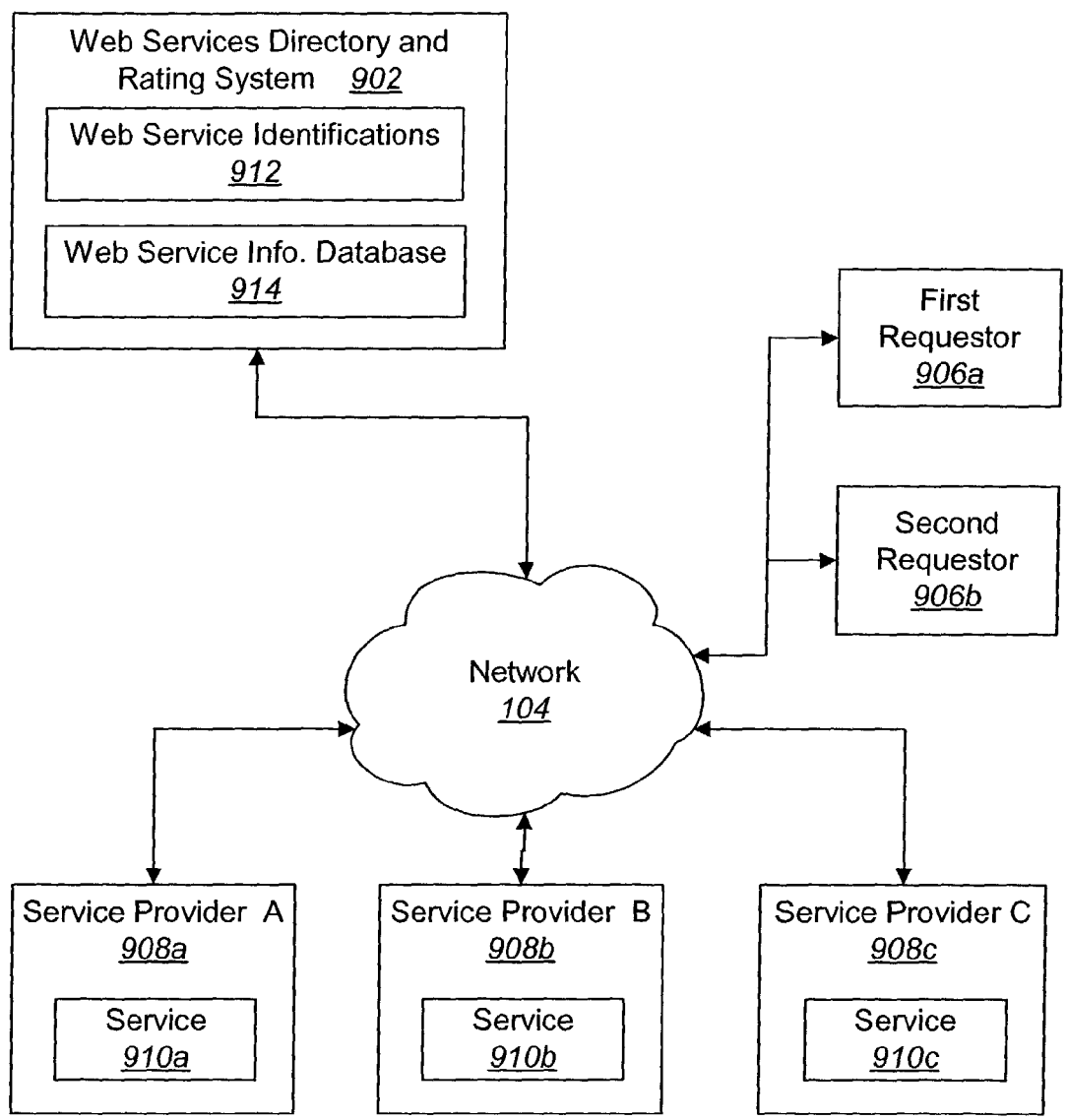
FIG. 9 is a network block diagram illustrating an embodiment of a combined rating system for web services and web services directory.

FIG. 9 is a block diagram of another embodiment of a rating system 902. In the embodiment shown in FIG. 9, the rating system 902 is combined with a web services directory. The other components and operation of the embodiment are similar to that shown and described above in relation to FIG. 2. The rating system 902 and web services directory engage in electronic communications with service providers 908 and requestors 906.

Figure 10:
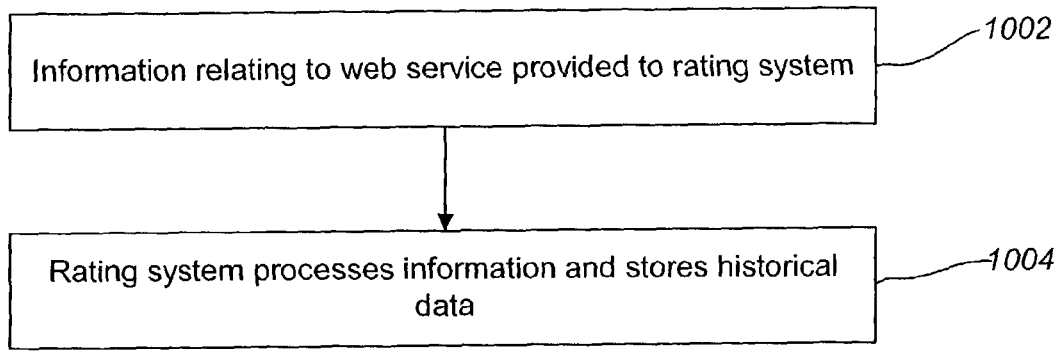
FIG. 10 is a flow diagram illustrating a method for providing information to the rating system.

FIG. 10 is a flow diagram illustrating a method for providing information to the rating system 102. The order of the steps or actions of the methods described in connection with the embodiments disclosed herein may be changed by those skilled in the art without departing from the scope of the present invention. Thus, any order in the Figures or detailed description is for illustrative purposes only and is not meant to imply a required order. Information relating to a web service is provided 1002 to the rating system 102. This information may be any kind of information that relates to a web service. The rating system processes 1004 this information and stores additional historical data. The rating system 102 may simply store the information provided, or it may process the information provided to produce the information that is stored as historical data.

Figure 11:
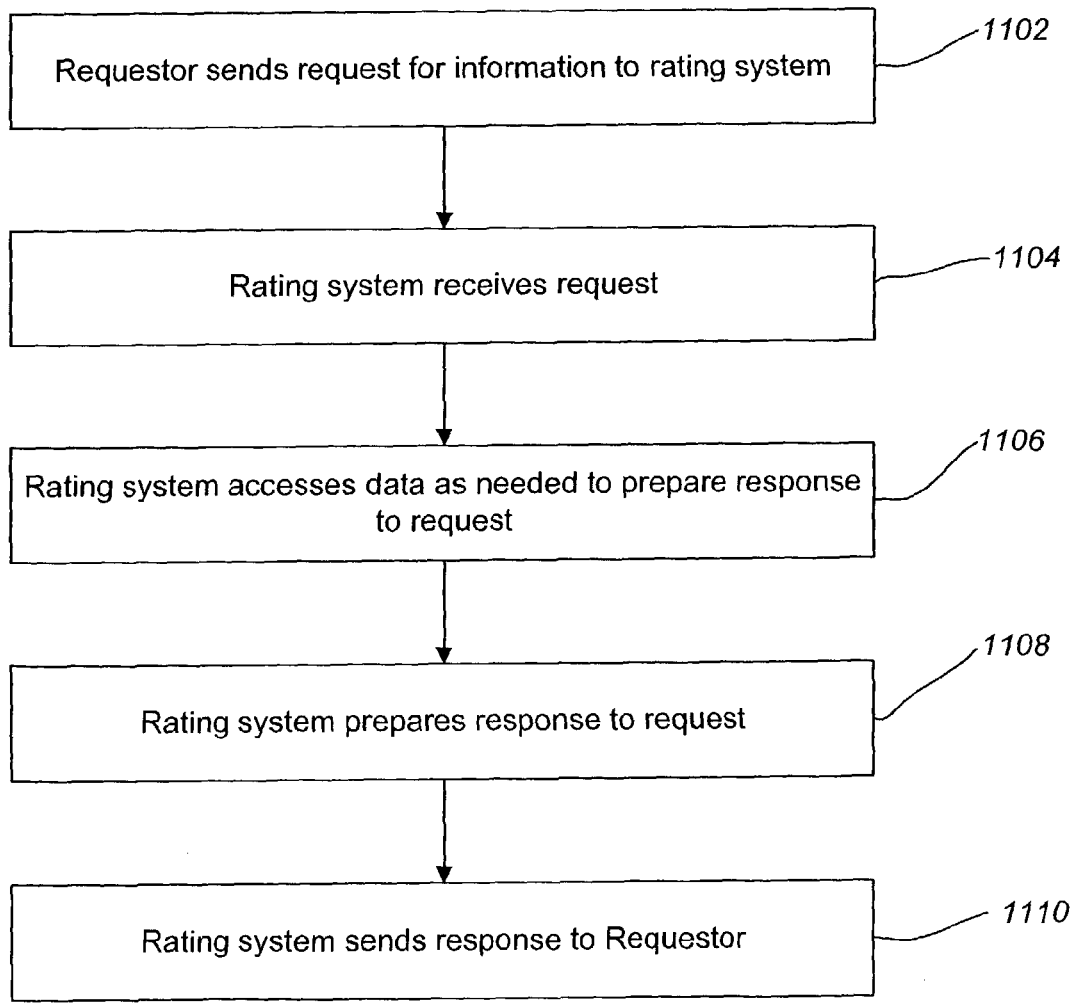
FIG. 11 is a flow diagram illustrating a method for requesting information from the rating system.

FIG. 11 is a flow diagram illustrating a method for requesting information from the rating system 102. A requester sends 1102 a request for information to the rating system 102. The rating system 102 receives 1104 the request and accesses 1106 data as needed to prepare a response to the request. The rating system 102 then prepares 1108 a response to the request and sends 1110 the response to the requestor.

Figure 12:
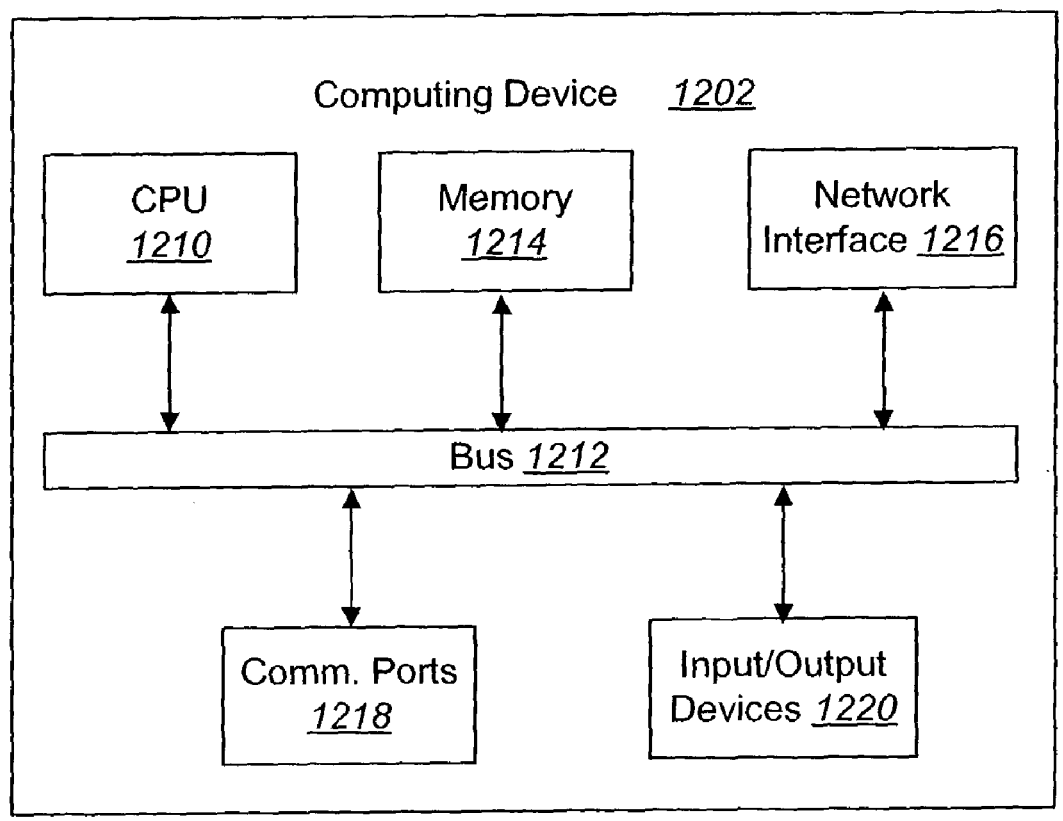
FIG. 12 is a block diagram of hardware components that may be used in an embodiment of a computing device.

FIG. 12 is a block diagram of hardware components that may be used in an embodiment of a computing device 1202 which may be used in implementing the embodiments described herein. A CPU 1210 or processor 1210 may be provided to control the operation of the computing device 1202, including the other components thereof, which are coupled to the CPU 1210 via a bus 1212. The CPU 1210 may be embodied as a microprocessor, microcontroller, digital signal processor or other device known in the art. The CPU 1210 performs logical and arithmetic operations based on program code stored within the memory 1214. In certain embodiments, the memory 1214 may be on-board memory included with the CPU 1210. For example, microcontrollers often include a certain amount of on-board memory.

The computing device 1202 may also include a network interface 1216. The network interface 1216 facilitates communication between the embedded device 1202 and other devices connected to the network 104. The network 104 may be a pager network, a cellular network, a global communications network, the Internet, a computer network, a telephone network, etc. The network interface 1216 operates according to standard protocols for the applicable network 104.

The computing device 1202 may also include memory 1214. The memory 1214 may include a random access memory (RAM) for storing temporary data. Alternatively, or in addition, the memory 1214 may include a read-only memory (ROM) for storing more permanent data, such as fixed code and configuration data. The memory 1214 may also be embodied as a magnetic storage device, such as a hard disk drive. The memory 1214 may be any type of electronic device capable of storing electronic information.

The computing device 1202 may also include communication ports 1218, which facilitate communication with other devices. The embedded device 1202 may also include input/output devices 1220, such as a keyboard, a mouse, a joystick, a touchscreen, a monitor, speakers, a printer, etc.

One example of a web service is remote monitoring. Many useful device networks involve remote monitoring, the one-way transfer of information from one node to another. In these applications, providers typically act as small servers that report certain information in response to a requestor. Providers can also be set up to publish their state information to subscribers. A requestor may ask for periodic reports or for updates whenever the state changes, perhaps with some means of limiting how often updates are to be sent. Providers can be set up to notify requesters when some event or exceptional condition occurs.

Another example of a web service is remote control, where requesters are able to send commands to providers to invoke some specific action. In most cases, remote control involves some sort of feedback.

A still further example of a web service is distributed control systems. The functions and data associated with individual providers can be combined and coordinated through a network to create a distributed system that provides additional value. Sometimes these distributed control systems can be established more or less automatically. In many cases, a more sophisticated device joins a peer-to-peer network to perform configuration, monitoring or diagnostic duties. Such systems may be created by objects that communicate as peers or through a master-slave configuration, in which each object in the system communicates with a single, central node that contains all of the control logic.

There are a variety of ways in which requesters may connect to providers. When a relatively small number of providers are involved a requestor may use a web browser, pager or even a WAP-enabled cell phone to communicate with a provider in a more or less interactive manner.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A system for rating web services, the system comprising:
   a computer including a network interface for electronic communications with a communications network, wherein the computer is configured to process rating information input regarding a web service and use the rating information input, and wherein the computer is also configured to respond to a request for rating information;
   a plurality of web service identifications for identifying web services;

a prediction engine for predicting behavior regarding the performance of the web service based on prediction inputs;

web service information that relates to the web services, wherein the web service information was obtained through use of the rating information input, wherein both the web service information and the prediction inputs comprise historical data obtained by the system;

a plurality of factors that determine an overall rating of the web services;

one or more weights that correspond to the plurality of factors in order to weight the factors according to user input;

a web services directory including a list of a plurality of web services and a uniform resource locator (URL) for each of the web services within the plurality of web services; and a new web service, wherein the system does not have past performance data for the new web service, wherein the system uses a web service information database that is preloaded with related past performance data of a related web service, wherein the related web service provides similar services as the new web service, wherein the system uses the related past performance data of the related web service to rate the new web service.

2. The system as defined in claim 1, wherein the rating information input comprises a web services provider report.

3. The system as defined in claim 1, wherein the rating information input comprises a requestor report.

4. The system as defined in claim 1, wherein the rating information input comprises a third-party monitoring service report.

5. The system as defined in claim 1, wherein the rating information input comprises out-of-band feedback.

6. The system as defined in claim 1, wherein the rating information input comprises randomly-generated information.

7. The system as defined in claim 1, wherein the rating information input comprises observations from the system for rating web services.

8. The system as defined in claim 1, wherein the rating information input comprises in-band feedback.

9. The system as defined in claim 1, wherein the historical data used for the web service information is selected from the group consisting of speed, bandwidth, job size, quality assertions, provider assertions, length of rating history, diversity of rating sources and ratings of rating providers.

10. The system as defined in claim 9, wherein the prediction inputs are selected from the group consisting of system dependencies, non-system dependencies and web service parameters.

11. The system as defined in claim 1, wherein the rating information input regarding a web service is sent to the computer via a computer network.

12. The system as defined in claim 1, wherein the computer is further configured to respond to a request for rating information sent to the computer from a requestor via a computer network.

13. The system as defined in claim 1, wherein the computer is further configured to respond to a request for rating information sent to the computer from a requestor via a computer network, and wherein the request for rating information includes a plurality of query inputs.

14. The system as defined in claim 1, wherein the web services are accessed using the SOAP web protocol.

15. A system for rating web services, the system comprises:

a processor;

a network interface in electronic communication with the processor;

memory in electronic communication with the processor for storing data;

program instructions stored in the memory and implementing a method to process rating information input regarding a web service, to use the rating information input, and to respond to a request for rating information;

a plurality of web service identifications for identifying web services;

a prediction engine for predicting behavior regarding the performance of the web service based on prediction inputs;

web service information that relates to the web services, wherein the web service information was obtained through use of the rating information input, wherein both the web service information and the prediction inputs comprise historical data obtained by the system;

a plurality of factors that determine an overall rating of the web services;

one or more weights that correspond to the plurality of factors in order to weight the factors according to user input; and a web services directory including a list of a plurality of web services and a uniform resource locator (URL) for each of the web services within the plurality of web services; and a new web service, wherein the system does not have past performance data for the new web service, wherein the system uses a web service information database that is preloaded with related past performance data of a related web service, wherein the related web service provides similar services as the new web service, wherein the system uses the related past performance data of the related web service to rate the new web service.

16. The system as defined in claim 15, wherein the web services are accessed using the SOAP web protocol.

17. A method for rating a web service from a provider, the method comprising:

receiving rating information input regarding a web service;

using the rating information input to update web service information that relates to the web service;

receiving a request for rating information;

using a plurality of factors to determine an overall rating of the web services;

associating one or more weights with the plurality of factors in order weight the factors according to user input;

accessing the web service information;

using a web services directory to access a list of a plurality of web services and a uniform resource locator (URL) for each of the web services within the plurality of web services;

using a prediction engine for predicting behavior regarding the performance of the web service based on prediction inputs;

preparing a response to the request for rating information; and sending the response to the request for rating information, wherein both the web service information and the prediction inputs comprise historical data obtained by the system; and providing a new web service, wherein the system does not have past performance data for the new web service, wherein the system uses a web service information database that is preloaded with related past performance data of a related web service, wherein the related web service provides similar services as the new web service, wherein the system uses the related past performance data of the related web service to rate the new web service.

18. The method as defined in claim 17, wherein the rating information input comprises a web services provider report.

19. The method as defined in claim 17, wherein the rating information input comprises a requestor report.

20. The method as defined in claim 17, wherein the rating information input comprises a third-party monitoring service report.

21. The method as defined in claim 17, wherein the rating information input comprises out-of-band feedback.

22. The method as defined in claim 17, wherein the rating information input comprises randomly-generated information.

23. The method as defined in claim 17, wherein the rating information input comprises observations from a system for rating web services.

24. The method as defined in claim 17, wherein the rating information input comprises in-band feedback.

25. The method as defined in claim 17, wherein the historical data used for the web service information is selected from the group consisting of speed, bandwidth, job size, quality assertions, provider assertions, length of rating history, diversity of rating sources and ratings of rating providers.

26. The method as defined in claim 25, wherein the prediction inputs are selected from the group consisting of the historical data, system dependencies, non-system dependencies and web service parameters.

27. The method as defined in claim 17, wherein the rating information input regarding a web service is sent via a computer network.

28. The method as defined in claim 17, wherein the request for rating information includes a plurality of query inputs.

29. The method as defined in claim 17, wherein the web services are accessed using the SOAP web protocol.

30. A computer-readable medium for storing program data, wherein the program data comprises instructions that are executable to:

receive rating information input regarding a web service;

use the rating information input to update web service information that relates to the web service;

receive a request for rating information;

use a plurality of factors to determine an overall rating of the web services;

associate one or more weights with the plurality of factors in order weight the factors according to user input;

access the web service information;

use a web services directory to access a list of a plurality of web services and a uniform resource locator (URL) for each of the web services within the plurality of web services;

use a prediction engine for predicting behavior regarding the performance of the web service based on prediction inputs;

prepare a response to the request for rating information; and send the response to the request for rating information, wherein both the web service information and the prediction inputs comprise historical data obtained by the system; and provide a new web service, wherein the system does not have past performance data for the new web service, wherein the system uses a web service information database that is preloaded with related past performance data of a related web service, wherein the related web service provides similar services as the new web service, wherein the system uses the related past performance data of the related web service to rate the new web service.

31. The computer-readable medium as defined in claim 30, wherein the web services are accessed using the SOAP web protocol.

* * * * *

UNITED STATES PATENT AND TRADEMARK OFFICE
CERTIFICATE OF CORRECTION

| | | |
|---|---|---|
| PATENT NO. | : 7,792,952 B2 | Page 1 of 1 |
| APPLICATION NO. | : 10/404583 | |
| DATED | : September 7, 2010 | |
| INVENTOR(S) | : Michael L. Howard et al. | |

It is certified that error appears in the above-identified patent and that said Letters Patent is hereby corrected as shown below:

In the Title Page under "Inventors" delete "Satl Lake City" and replace it with --Salt Lake City--.

In column 5, line 19, delete "requester" and replace it with --requestor--.
In column 5, line 20, delete "requester" and replace it with --requestor--.
In column 5, line 22, delete "requester" and replace it with --requestor--.
In column 5, line 63, delete "requesters" and replace it with --requestors--.
In column 8, line 35, delete "requester" and replace it with --requestor--.
In column 9, line 19, delete "requesters" and replace it with --requestors--.
In column 9, line 22, delete "requesters" and replace it with --requestors--.
In column 9, line 37, delete "requesters" and replace it with --requestors--.

Signed and Sealed this
Eighteenth Day of January, 2011

David J. Kappos
*Director of the United States Patent and Trademark Office*